United States Patent
Harris et al.

(10) Patent No.: US 8,295,874 B2
(45) Date of Patent: Oct. 23, 2012

(54) FEMTO-CELL POWER CONTROL USING IDLE-MODE USER EQUIPMENT IN A CELLULAR COMMUNICATION SYSTEM

(75) Inventors: John M. Harris, Glenview, IL (US); Guang Han, Arlington Heights, IL (US)

(73) Assignee: Motorola Mobility LLC, Libertyville, IL (US)

( * ) Notice: Subject to any disclaimer, the term of this patent is extended or adjusted under 35 U.S.C. 154(b) by 408 days.

(21) Appl. No.: 12/773,338

(22) Filed: May 4, 2010

(65) Prior Publication Data
US 2010/0317394 A1    Dec. 16, 2010

Related U.S. Application Data

(60) Provisional application No. 61/185,753, filed on Jun. 10, 2009.

(51) Int. Cl.
*H04Q 7/20* (2006.01)

(52) U.S. Cl. .... 455/522; 455/68; 455/127.1; 455/67.11; 455/445; 455/517; 370/310; 370/328; 370/329; 370/338; 370/343

(58) Field of Classification Search ............. 455/522, 455/69, 68, 127.1, 500, 517, 445, 67.11, 455/422.1, 403, 426.1, 426.2, 515, 509, 450, 455/434, 550.1; 370/310, 328, 329, 338, 370/343, 350
See application file for complete search history.

(56) References Cited

U.S. PATENT DOCUMENTS

| | | | |
|---|---|---|---|
| 5,722,072 A | 2/1998 | Crichton et al. | |
| 5,881,368 A | 3/1999 | Grob et al. | |
| 7,499,700 B2 | 3/2009 | Dillon et al. | |
| 2002/0068569 A1* | 6/2002 | Chen et al. | 455/437 |
| 2006/0063521 A1 | 3/2006 | Cheung et al. | |
| 2006/0262840 A1* | 11/2006 | Wang et al. | 375/221 |
| 2008/0076352 A1* | 3/2008 | Der | 455/41.2 |
| 2008/0207249 A1* | 8/2008 | Choi et al. | 455/522 |
| 2009/0111499 A1 | 4/2009 | Bosch et al. | |
| 2009/0143092 A1* | 6/2009 | Vaittinen et al. | 455/522 |

FOREIGN PATENT DOCUMENTS

| | | |
|---|---|---|
| CA | 2304654 A1 | 4/1999 |
| EP | 2071738 A1 | 6/2009 |
| WO | 9967898 | 12/1999 |

OTHER PUBLICATIONS

Patent Cooperation Treaty, International Search Report and Written Opinion of the International Searching Authority for International Application No. PCT/US2010/035923, Mar. 9, 2011, 12 pages.

* cited by examiner

*Primary Examiner* — Keith Ferguson

(57) ABSTRACT

Disclosed is a method for providing power control using idle-mode user equipment attached to a cell in a wireless communication system. First and second higher power level thresholds for signal transmissions of a cell are defined, wherein the first power level has a defined offset higher than a minimum required power level, and wherein the first and second power level thresholds define an operating power band therebetween. The user equipment measures a signal transmission power level. If the idle-mode user equipment determines that the signal transmission power level falls outside of the operating power band, then a message is sent to affect a change in signal transmission power level.

18 Claims, 2 Drawing Sheets

FEMTO-CELL POWER CONTROL USING IDLE-MODE USER EQUIPMENT IN A CELLULAR COMMUNICATION SYSTEM

CROSS-REFERENCE TO RELATED APPLICATIONS

The present application claims priority to U.S. Provisional Patent Application 61/185,753, filed on Jun. 10, 2009.

FIELD OF THE INVENTION

The present invention is related generally to interference in a wireless cellular communication system and, more particularly, to femto-cell power control using idle-mode user equipment in a cellular communication system.

BACKGROUND OF THE INVENTION

A method which has been used to increase the capacity of cellular communication systems depends upon the concept of hierarchical cells wherein a macro-cell layer is underlayed by a layer of typically smaller cells having coverage areas within the coverage area of the macro-cell. In this way, the smaller cells, known as micro-cells, pico-cells, or femto-cells (hereinafter collectively referred to as femto-cells) are located within the same coverage area as larger overlaying macro cells. The femto-cells have much smaller coverage thereby allowing a much closer reuse of resources. Frequently, the macro-cells are used to provide coverage over a large area, and the smaller underlay cells are used to provide additional capacity in densely populated areas and hotspots, for example. Furthermore, femto-cells can also be used to provide coverage in specific locations such as within a residential home or office. In order to efficiently exploit the additional resources, it is important that any interference between cells is minimized.

Currently 3rd generation cellular communication systems based on code-division multiple access ("CDMA") technology, such as the Universal Mobile Telecommunication System ("UMTS") or 4G Long Term Evolution ("LTE"), are being deployed with a trend towards introducing a large number of femto-cells. For example, it is envisaged that a Home-evolved NodeB ("HeNB") may be deployed having a target coverage area of only a single residential dwelling. A widespread introduction of such a system could result in a very large number of small underlay cells within a single macro-cell.

Generally, during deployment of a cellular network of macro cells and underlay cells, it would be desirable for the planned layout to be fixed and known. In a centrally controlled database deployment process, well established techniques exist to calculate the optimal pilot power levels for fixed and known layouts. For example, the underlay cells of such systems can receive a neighbor list identifying a number of neighbor cells and the underlay cells' measured pilot signal power levels of these neighbor cells. These levels for each neighbor macro-cell can be measured and reported back to the central database, such as in a radio network controller ("RNC") or a Mobile Switching Centre ("MSC"). The central database could then use these measurements to determine an appropriate pilot power level for that underlay-cell. However, a problem arises in the ad hoc introduction of underlaying femto-cells, such as residential deployments of femto-cell HeNBs where the deployment process is incremental, unilateral, and changeable.

In particular, without coordination between the RNC of the macro layer and the HeNB layer, and considering a much smaller dynamic range of power control at the HeNB, there are cases where the macro layer can suffer interference from the control pilot channel power of the HeNB in close proximity thereto and vice versa. Different from macro eNBs, femto-cell HeNBs typically only support a small number of pre-registered user equipment (UE). To reduce interference towards the macro layer, it is desirable that HeNBs employ minimum necessary power so as to cover all pre-registered UEs that are within the residential area. Although this minimum power level can be determined easily for connected-mode UEs according to the dedicated signalling between the HeNB and the connected-mode UEs, it is difficult to obtain the minimum power level to ensure coverage for idle-mode UEs as no dedicated signalling exists between the HeNB and the idle-mode UEs. Additionally, an ad hoc cellular system that consists of femto-cells of HeNBs and macro-layer mobile user equipment is by definition changeable. No settings, regardless of how optimal, are stable for long, and they will change over time.

BRIEF SUMMARY

The above considerations, and others, are addressed by the present invention, which can be understood by referring to the specification, drawings, and claims. According to aspects of the present invention, a method provides power control using idle-mode user equipment attached to a cell in a wireless communication system. First and second higher power level thresholds for signal transmissions of a cell are defined, wherein the first power level has a defined offset higher than a minimum required power level, and wherein the first and second power level thresholds define an operating power band therebetween. The user equipment measures a signal transmission power level. If the idle-mode user equipment determines that the signal transmission power level falls outside of the operating power band, then a message is sent to affect a change in signal transmission power level.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
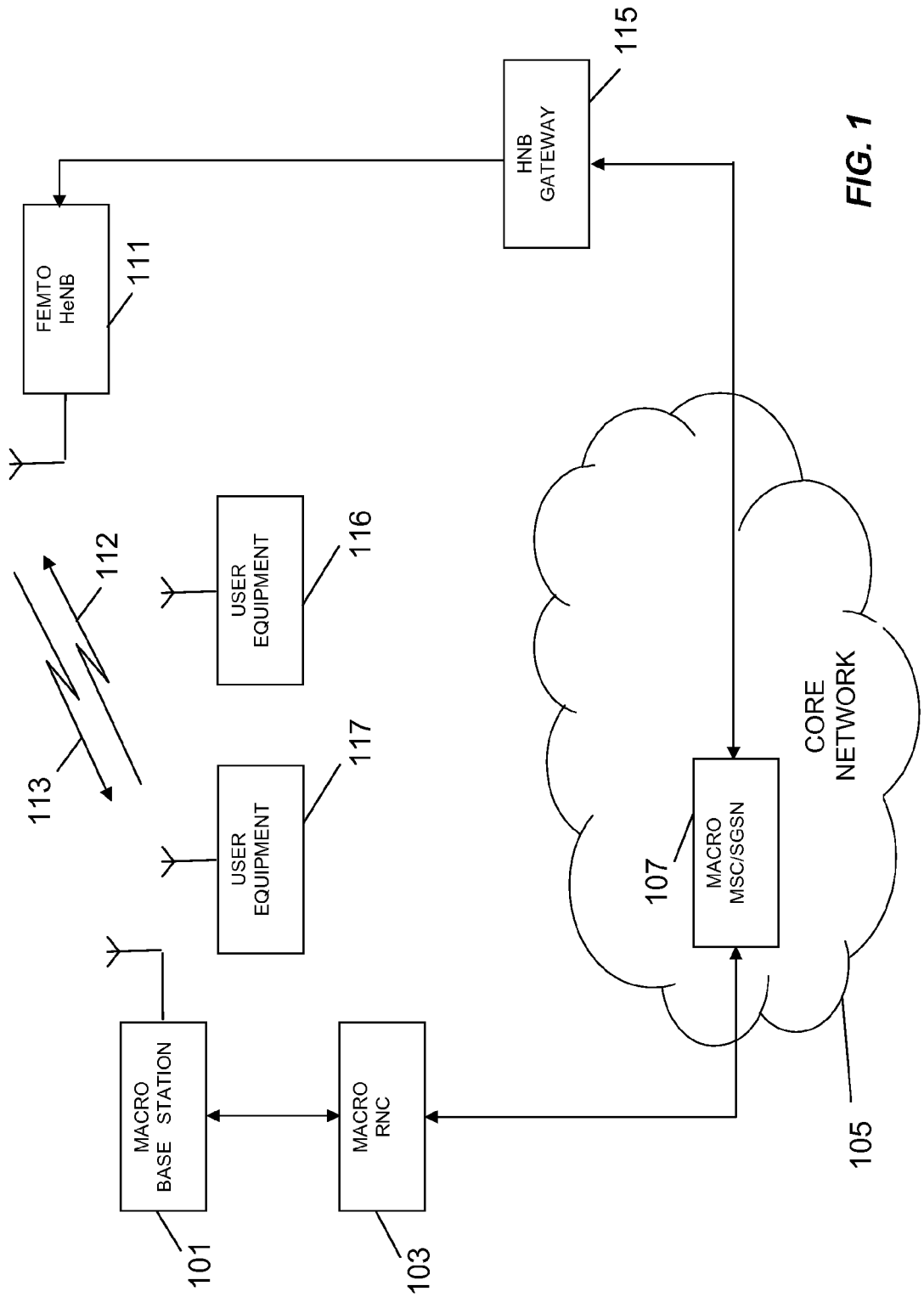
FIG. 1 is a block diagram of a system embodying aspects of the present invention.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

The present invention provides a technique to configure HeNB control channel power in response to reports from idle-mode UEs. The present invention also minimizes femto-cell transmission power while providing coverage for UEs authorized for that femto-cell and avoids numerous control messages between UEs and their serving femto-cell while providing information to the femto-cell to best enable downlink control channel transmission power reduction. Note that the current invention is mainly focused on optimizing the control channel transmission power and rate in order to dynamically adjust cell footprint to best meet the needs of those authorized UEs. This control channel is the highest power control channel within that cell, e.g., this is the control channel, which UEs not currently camping on the cell may use to determine when they should hand off to the cell.

The present description focuses on embodiments of the invention applicable to a CDMA cellular communication system and in particular to a 3rd Generation Cellular communication system such as a High Speed Packet Access ("HSPA") UMTS System or a 4th Generation cellular communication system such as LTE and WiMAX. However, it will be appreciated that the invention is not limited to these application but may be applied to many other cellular communication systems. Also, the description focuses on scenarios of a serving HeNB of a femto-cell. However, it will be appreciated that the described principles apply equally to other hierarchical scenarios.

FIG. 1 illustrates an example of a femto-cell cellular communication system which in this specific example is a 4G LTE cellular communication system. In the system, a macro-layer is formed by macro-cells supported by base stations 101 (only one shown). Furthermore, the femto-cells in an underlay layer (only one shown) are each supported by a small base station which is referred to as a HeNB 111. Specifically, each HeNB 111 may have an intended coverage of a single house or dwelling. In the system, each HeNB 111 is controlled by a central server such as a HeNB-gateway ("HeNB-GW") 115 that may be co-located in the same physical unit. However, it should be recognized that each HeNB 111 can operate unilaterally and autonomously in accordance with the present invention.

The HeNB-GW 115 is furthermore coupled to a core network 105 which interfaces to other radio access networks, MSCs, and RNCs. A HeNB registration server can be provided in any of a MSC/SGSN 107, gateway 115, core network 105, or as a standalone element. In the example of FIG. 1, the HeNB-GW 115 is coupled to a macro MSC 107 of the overlayer macro-cells serving a macro RNC 103. It should be recognized that the MSC function need not be present if already incorporated into the associated RNC 103 or HeNB-GW 115.

Each of the base stations 101 supports a macro-cell. The base stations 101 can implement the required functionality of a UMTS base station in order to support UMTS communications. One macro-cell base station 101 overlays at least one femto-cell 111 serving the UEs 116, 117. It should be recognized that the femto HeNB 111 or the HeNB-GW 115 of the invention can be represented equally as an HeNB Gateway or Controller, HeNB Registration Server, Virtual Private Network, Generic Access Network, Universal Mobile Access, or any other server, network gateway, or authority as known in the art.

In practice, femto-cells are expected to be installed by end users rather than by operators. Due to complicated indoor propagation environments and arbitrary femto-cell deployment, femto-cell planning becomes very challenging if not impossible. To ensure coverage, a femto-cell may have to adopt high control channel power which could lead to large overlapping area with neighboring (macro- or femto-) cells. In a residential deployment, the pilot power setting is defined by the requirements to (a) achieve an adequate coverage area within the residence and (b) ensure the pilot power is balanced at the cell edge with respect to any neighbors. In the absence of any strong signaled neighbors, requirement (a) will define the boundaries. In an area with a high density of neighbors, requirement (b) will dominate. However, in general, both requirements must be considered.

At start up, a user connects an HeNB to an HeNB server or gateway. The gateway updates the HeNB with the distance with respect to any neighboring cells and the neighboring cells' power levels. Using this information, the HeNB can assign an approximate initial pilot power level for itself based on the maximum of: (a) the minimum power needed to achieve coverage in close proximity to the cell and (b) the minimum power needed for a UE to receive a comparable power from both the HeNB pilot and a neighboring HeNB pilot in close proximity to the cell. This power level allows a call to be made on the HeNB in the presence of interference and enables the UE to measure the power levels of all nearby neighbors' pilot signal levels.

The present invention provides suitable power and interference management techniques in the HeNB itself. In this way, HeNBs can be managed such that minimal interference issues are likely to be seen that will impact on normal HeNB performance for the majority of all likely deployment scenarios. Interference mitigation measures are utilized at the HeNB to ensure good operation, as detailed below. The present invention provides a technique to alleviate the impact of HeNB downlink control channel power on interference.

In operation, a UE in idle or sleep mode periodically wakes up to observe if there is a signal for that UE during a specific interval (e.g., a paging interval where the UE can listen to potential paging messages at predetermined time slots or where the UE can request network access). In addition, it is likely that the HeNB will have a location area that is distinct from its neighboring HeNBs and macro cell. This ensures that the UE triggers a tracking area update immediately upon camping in the HeNB or on leaving the HeNB. It is assumed that when the UE moves from the HeNB to the macro cell, the UE performs one or more of a location, tracking, routing area update (collectively referred to herein as a "tracking" area update) to the macro cell. Modified tracking updates can be used in the present invention as described below. In accordance with the present invention, an idle-mode UE sends a modified tracking area update message to its serving HeNB when any of the following events occurs.

First, when the HeNB 111 broadcasts that downlink control channel transmission power is below a maximum allowed transmission power and the received HeNB power minus a minimum required power is less than a first power level threshold (e.g., 6 dB), the UE sends a message 112 (e.g., a modified tracking area update message) to the HeNB 111 to request a power increase. In this scenario, the femto-cell is not transmitting at its maximum power, and the UE has poor femto-cell coverage. The UE can be informed of the maximum allowed transmission power or the amount of transmission power less than the maximum by a broadcast from the HeNB 111. In particular, the HeNB 111 can advertising its power less than its maximum thru at least one of: (a) dB down from its maximum power level, (b) percent of its maximum transmit power, and (c) explicit indication of its current or maximum transmit power through overhead messaging.

Second, if the UE is the "most distant" UE (e.g., UE 117) as broadcasted by the HeNB 111, and it detects over a predefined short time period (e.g., ten seconds) that the received HeNB power minus the minimum required power is larger than a second power level threshold (e.g., 9 dB), then the UE 117 sends a message 112 to the HeNB 111 to request a power decrease. In this scenario, the most distant UE 117 is picked by the HeNB 111 according to the measurement reports from all UEs 116, 117 after they enter its coverage. The HeNB 111 broadcasts 113 the ID of the most distant UE 117 so that only this UE 117 will signal the HeNB 111 when its received power is too large. Every UE 116, 117 under the HeNB 111 periodically reads this system information to see if it becomes the "most distant" UE. It should be noted that without this feature there could be conflicting signaling if the UEs 116 relatively close to the HeNB 111 also send messages to request a power decrease. Based on the UE message 112, the HeNB 111 decreases its power so that the expected UE received power minus the minimum required power substantially equals the first power level threshold (e.g., 6 dB). In order to ensure that the HeNB 111 maintains a timely update of the identity of the "most distant" UE, a UE needs to send a measurement report whenever it detects a big change of the received HeNB signal strength (e.g., the difference between the current measurement and the measurement included in the last measurement report is over 10 dB). Moreover, before requesting a power decrease, a UE may read HeNB broadcast information to determine if it is still the "most distant" UE.

Third, if a UE consistently detects, over a predefined long time period (e.g., eight hours) that a received HeNB power minus the minimum required power is greater than the first power level threshold, the UE sends to the HeNB management system (or HeNB) a report including its measured received power, the time of measurement, and the minimum required power throughout the last predefined time period hours. Given this report, the HeNB management system (or HeNB) learns the behavior of this UE (and other UEs) and asks the serving HeNB (or directs itself) to adjust its power in the following days during the same time interval. In this scenario, the femto-cell is observed to be sufficiently consistently overpowered for a sufficiently long period of time, indicating a possible missed power-down opportunity. In addition, this scenario can result in the HeNB reducing its transmit power during the time of day or day of week covered by the UE report. It should be noted that the term "consistently detects" an event over some time interval means that the UE had detected the greater power condition over a large percentage (e.g., 95%) of the time interval in which the condition occurs. In addition, signal strength measurement reports from the UE could be normalized given the advertised femto-cell transmit powers and optionally where the measurement report was less than the first power level threshold and there was adequate macro-cell coverage. The UE may also send measurement reports including the measured HeNB power and the time of measurement to the HeNB even when it does not detect that the HeNB power is more than sufficient (or insufficient). The femto-cell can record its transmit power versus the time of day for comparison with the UE report and accordingly adjust (increase or decrease) its power to best meet UEs' needs during different time of day or day of week.

Fourth, if the UE has no coverage for a long interval, the UE can perform a registration with a macro base station 101, which can then direct its underlaying femto-cell to power up, which is immediately followed by the UE being covered by the femto-cell 111. This scenario is a likely missed opportunity for femto-cell coverage. In addition, the UE can report how long it was out of femto-cell coverage. UE reporting may be throttled if the femto-cell indicates that it is or has been at maximum transmit power for some time. In this scenario, if the UE detects no femto-cell coverage, it can perform at least one of: (a) GPS location where the femto-cell was previously reported or observed and (b) observe Bluetooth or RFID or other peer-to-peer signaling, indicating a likelihood of the proximity of the femto-cell.

In practice, for the above scenarios, the first power level threshold is determined by the UE scanning period while it in idle mode and the measured or expected UE speed within the femto-cell. For example, the longer the UE scanning period is, the larger the first power level threshold is set to compensate for possible deteriorating channel conditions during that longer period. In addition, the larger the UE speed, the larger the first power level threshold is set, to compensate for the case where the UE may be moving out of range. The femto-cell or user can configure the UE scanning period if the user is expected to move at a higher speed (e.g., when there is a party). Also, the UE can increase its scanning frequency if a large change of the measured femto-cell signal strength has occurred. If the UE loses femto-cell coverage (e.g., the first power level threshold is too small) and the UE knows that the femto-cell is not transmitting at its maximum power, the UE can send a ranging message to the femto-cell based on its residual synchronization and configuration information. Most likely the UE will notice the coverage loss within a scanning period, which is at most a couple of seconds, causing a control channel power increase of the femto-cell. In this case, the ranging code and ranging slot can be pre-determined so that the femto-cell knows who sends the ranging message. In addition, if the UE loses femto-cell coverage, the UE can send a message to the overlay macro cell (if one exists) which will command the femto-cell to increase its power through backhaul signaling.

In order to simplify system design and implementation, the proposed mechanisms may be enabled only if at least one of the following conditions is met:
 The number of users camping on the cell is in a predetermined range (e.g., between one and three);
 The cell is a closed-access cell;
 Less than a threshold number of authorized users are camping on the cell; and
 Less than a threshold number of users which are authorized for this cell but are not camping on the cell and are at least one of:
  Powered on,
  Registered,
  Under the overlay macrocell,
  Under the tracking area of the overlay macrocell, and
  Within a threshold distance of the cell.

Figure 2:
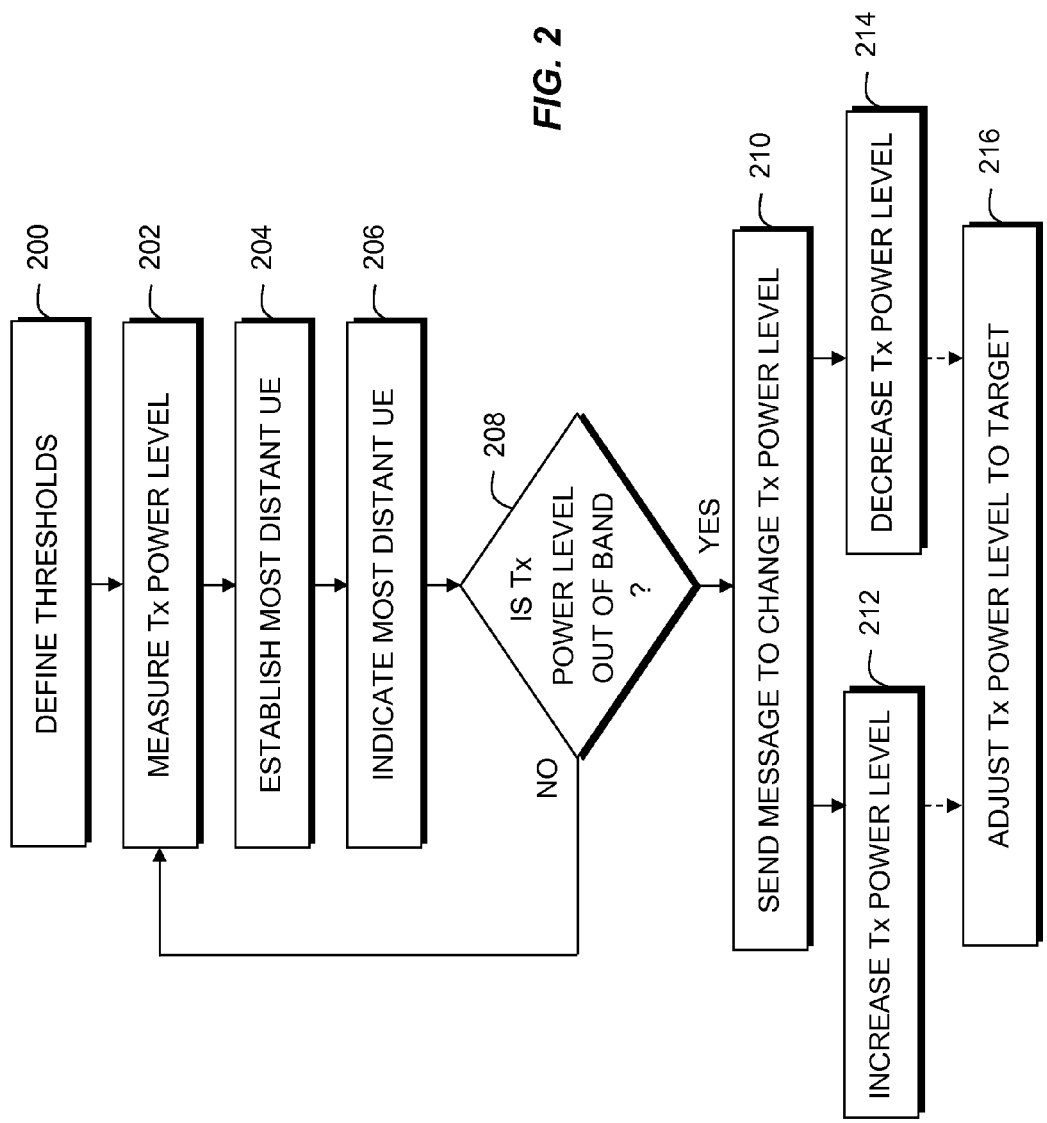
FIG. 2 is a flowchart of an exemplary method embodying aspects of the present invention.

FIG. 2 presents an exemplary method for downlink control channel power control using idle-mode user equipment in a wireless communication system in accordance with aspects of the present invention.

The method begins with a step 200 of defining a first power level threshold and a second power level threshold for signal transmissions of a cell. The first and second power level thresholds define an operating power band therebetween. The first power level has a defined offset higher than a minimum required power level for communication with user equipment in the femto-cell. The second power level is higher than the first power level threshold. The first power level threshold can be determined in response to a scanning period of the user equipment. For example, the scanning period can be changed when there is a change in signal transmission power level from the femto-cell that is greater then a change threshold. The first power level threshold can also be determined in response to a speed of the user equipment in the cell.

A next step 202 includes measuring, by an idle-mode user equipment attached to the femto-cell, a signal transmission power level of the downlink control channel from the HeNB or from the serving base station of the femto-cell to the attached idle-mode user equipment. Optionally, this step 202 can include measuring the signal transmission power level for a predetermined time period.

A next step 204 includes establishing that the idle-mode user equipment is the most distant user equipment attached to the cell. In practice, this step includes obtaining measurement reports from all user equipment attached to the femto-cell and choosing the user equipment with the lowest measurement report as the most distant user equipment.

A next step 206 includes indicating to the idle-mode user equipment that it is the most distant user equipment attached to the cell. The indicating can be done via a unicast or broadcast.

A next step 208 includes determining by the idle-mode user equipment attached to the femto-cell that the signal transmission power level of the downlink control channel falls outside of the operating power band. For example, the most distant user equipment could determine that the signal transmission power level falls above the second power level threshold. Optionally, this step 208 can include receiving an advertised power level of the femto-cell that is below its maximum power level and determining that the cell power level could be adjusted into the operating band given the advertised power level. In another option, if the measuring step 202 utilizes a predetermined time period, then this step can include determining that the signal transmission power level falls outside of the operating power band for more than a defined portion of the predetermined time period.

A next step 210 includes sending, by the user equipment, a message operable to affect a change in signal transmission power level of the downlink control channel. The message can be an individual message, but in order to save messaging overhead it is preferred that the message be attached to an existing message, such as a tracking area update or ranging message that has been modified. In one example, if the signal transmission power level falls below the first power level threshold in step 208, then the message of the sending step includes a request for a signal transmission power increase. Any user equipment can request a power increase. In another example, if the signal transmission power level determined by the most distant user equipment falls above the second power level threshold in step 208, then the message includes a request for a signal transmission power decrease. In yet another example, the message can indicate that the user equipment was out of femto-cell coverage for a particular time period. In this case the message can be sent with a ranging message to the femto-cell or can be sent through an overlay macro-cell to be conveyed to the femto-cell. Optionally, this step can include associating a signal transmission power level with a time of day that the message is sent.

If the sending step 210 calls for a power increase, a next step 212 includes increasing the signal transmission power level of the downlink control channel. This step 212 can include increasing the cell signal transmission power level of the downlink control channel to approach a predetermined power level, as long as the cell is not already operating at a maximum power level.

If the sending step 210 calls for a power decrease, a next step 214 includes decreasing the signal transmission power level of the downlink control channel.

An optional step 216 includes adjusting the cell signal transmission power level of the downlink control channel to approach a predetermined target power level, such as the first power level threshold.

Advantageously, the present invention enables femto-cells to decrease power while still enabling a mechanism for UE feedback to cause its power to increase, when an increase is possible. It also enables a UE to perform messaging to increase femto-cell coverage but only when it is possible for the femto cell increase its power. It further enables a smart power setting for idle-mode UEs, where the power being set can be the high power in the case where the femto cell was alternating between high and low power. It also enables efficient notification of a femto-cell after significant intervals, where the femto-cell control channel transmit power is significantly overpowered (or likely underpowered). In the case where the user has a predictable usage pattern, this could enable significantly reduced femto-cell transmit power for about half of the day.

It will also be appreciated that although the above description mainly focuses on a LTE/WiMAX/HSPA/UMTS embodiment, it is equally applicable to other systems and can be applicable to hybrid communication systems using different radio access technologies. For example, the macro base station may be a UMTS base station whereas the HeNB may be a GSM (or LTE) base station capable of supporting GSM air interface communications but not UMTS air interface communications. Thus, the same method of the invention can be used. However, in the example, the user equipment is a dual mode remote station providing intersystem communication between UMTS and GSM. Moreover, the invention can also be applied when the overlay cell and the underlay cell use different frequencies.

Also, although the above description has focused on a HeNB, it will be appreciated that the described principles are equally applicable to a situation where these are integrated into a different physical or logical network element (e.g., a micro or pico cell).

In view of the many possible embodiments to which the principles of the present invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

We claim:

1. A method for control channel power control using idle-mode user equipment in a wireless communication system, the method comprising:
    defining a first power level threshold and a second power level threshold for signal transmissions of a cell, wherein the first and second power level thresholds define an operating power band therebetween, wherein the first power level has a defined offset higher than a minimum required power level for communication with user equipment in the cell, and wherein the second power level is higher than the first power level threshold;
    measuring, by an idle-mode user equipment attached to the cell, a signal transmission power level from the cell;
    determining, by the idle-mode user equipment attached to the cell, that the signal transmission power level falls outside of the operating power band;
    sending, by the user equipment, a message operable to affect a change in signal transmission power level;
    establishing that the idle-mode user equipment is a most distant user equipment attached to the cell; and
    indicating to the idle-mode user equipment that it is the most distant user equipment attached to the cell;
    wherein if the signal transmission power level determined by the most distant user equipment falls above the second power level threshold, then the message includes a request for a signal transmission power decrease.

2. The method of claim 1 wherein if the signal transmission power level falls below the first power level threshold, then the message includes a request for a signal transmission power increase.

3. The method of claim 2 further comprising:
increasing the cell signal transmission power level to approach a predetermined power level as long as the cell is not operating at a maximum power level.

4. The method of claim 1 wherein establishing comprises obtaining measurement reports from all user equipment attached to the cell and choosing a user equipment with a lowest measurement report as the most distant user equipment; and wherein indicating includes broadcasting an identity of the most distant user equipment.

5. The method of claim 1 further comprising:
adjusting the cell signal transmission power level to approach a target power level.

6. The method of claim 5 wherein the target power level is the first power level threshold.

7. The method of claim 5 wherein determining comprises receiving an advertised power level of the cell below its maximum power level and determining that the cell power level could be adjusted into the operating band given the advertised power level.

8. The method of claim 1 wherein measuring comprises measuring the signal transmission power level for a predetermined time period and wherein determining comprises determining that the signal transmission power level falls outside of the operating power band for more than a defined portion of the predetermined time period.

9. The method of claim 1 wherein the message is a modified tracking area update.

10. The method of claim 1 wherein the signal transmission is a downlink broadcast control channel from a serving base station to the attached idle-mode user equipment.

11. The method of claim 1 wherein sending comprises sending a message indicating that the user equipment was out of cell coverage for a particular time period.

12. The method of claim 11 wherein the message is sent in a ranging message to the cell.

13. The method of claim 11 wherein the message is sent through an overlay cell to the cell.

14. The method of claim 1 wherein the first power level threshold is determined in response to a scanning period of the user equipment.

15. The method of claim 14 wherein the scanning period is changed when there is a change in signal transmission power level from the cell that is greater then a change threshold.

16. The method of claim 1 wherein the first power level threshold is determined in response to a speed of the user equipment in the cell.

17. The method of claim 1 wherein sending comprises associating a signal transmission power level with a time of day that the message is sent.

18. User equipment operable in a wireless communication system, the user equipment operable in an idle-mode while being attached to a serving base station, the user equipment comprising:
a memory operable to hold a defined first power level threshold and a second power level threshold for signal transmissions of the serving base station, wherein the first and second power level thresholds define an operating power band therebetween, wherein the first power level has a defined offset higher than a minimum required power level for communication with the user equipment in the cell, and wherein the second power level is higher than the first power level threshold;
a receiver operable to measure a signal transmission power level from the serving base station;
a processor coupled to the memory and to the receiver, the processor operable to determine that the signal transmission power level falls outside of the operating power band; and
a transmitter coupled to the processor, the transmitter operable to be directed by the processor to receive a first message indicating that the user equipment is a most distance user equipment attached to the cell and to send a second message operable to affect a change in signal transmission power level of the serving base station;
wherein if the signal transmission power level determined by the most distance user equipment falls above the second power level threshold, then the second message includes a request for a signal transmission power decrease.

* * * * *